US010104563B2

(12) United States Patent
Fang et al.

(10) Patent No.: US 10,104,563 B2
(45) Date of Patent: Oct. 16, 2018

(54) METHOD FOR SETTING MODES OF DATA TRANSMISSION, AND BASE STATION DEVICE AND TERMINAL DEVICE USING THE SAME

(71) Applicant: INDUSTRIAL TECHNOLOGY RESEARCH INSTITUTE, Hsinchu (TW)

(72) Inventors: Shih-Hao Fang, Zhubei (TW); Jen-Yuan Hsu, Jincheng Township (TW); Dung-Rung Hsieh, Hsinchu (TW); Jing-Shiun Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 28 days.

(21) Appl. No.: 15/392,385

(22) Filed: Dec. 28, 2016

(65) Prior Publication Data
US 2018/0167832 A1 Jun. 14, 2018

(30) Foreign Application Priority Data
Dec. 14, 2016 (TW) .............................. 105141418 A

(51) Int. Cl.
H04B 7/005 (2006.01)
H04W 24/08 (2009.01)
(Continued)

(52) U.S. Cl.
CPC .............. H04W 24/08 (2013.01); H04L 5/14 (2013.01); H04W 24/02 (2013.01); H04L 5/16 (2013.01)

(58) Field of Classification Search
USPC ....... 370/252, 276, 277, 278, 282, 286, 287, 370/296, 328, 330
See application file for complete search history.

(56) References Cited
U.S. PATENT DOCUMENTS 8,462,671 B2* 6/2013 Rinne ...................... H04B 1/44
370/276
2008/0153431 A1* 6/2008 Haartsen .................. H04B 1/48
455/78
(Continued)

FOREIGN PATENT DOCUMENTS

CN 103414669 A 11/2013
CN 103427872 A 12/2013
(Continued)

OTHER PUBLICATIONS

Taiwanese Office Action and Search Report, dated Nov. 8, 2017, for Taiwanese Application No. 105141418.
(Continued)

Primary Examiner — Kwang B Yao
Assistant Examiner — Nguyen H Ngo
(74) Attorney, Agent, or Firm — Birch, Stewart, Kolasch & Birch, LLP

(57) ABSTRACT

A method for setting modes of data transmission, adapted to the base station device provided. The method includes steps of: receiving a signal quality indicator and a value of interference cancellation capability from a terminal device; obtaining a power difference according to the signal quality indicator by subtracting a reception power of the terminal device from a transmission power of the terminal device; comparing the power difference with the value of interference cancellation capability, and setting the terminal device as a first type terminal device only allowed to apply half duplex transmission or a second type terminal device allowed to apply full duplex transmission according to the comparison result.

23 Claims, 7 Drawing Sheets

(51) Int. Cl.
*H04L 5/14* (2006.01)
*H04W 24/02* (2009.01)
*H04L 5/16* (2006.01)

(56) References Cited

U.S. PATENT DOCUMENTS

| | | | | |
|---|---|---|---|---|
| 2009/0296609 | A1* | 12/2009 | Choi | H04W 72/121 370/281 |
| 2012/0106340 | A1* | 5/2012 | Hoymann | H04B 7/15528 370/235 |
| 2013/0188530 | A1 | 7/2013 | Pirskanen et al. | |
| 2013/0223294 | A1 | 8/2013 | Karjalainen et al. | |
| 2015/0109969 | A1 | 4/2015 | Celebi et al. | |
| 2015/0229461 | A1 | 8/2015 | DiFazio et al. | |
| 2015/0312905 | A1 | 10/2015 | Seo et al. | |
| 2016/0095093 | A1* | 3/2016 | Yi | H04L 5/001 370/280 |
| 2017/0054544 | A1* | 2/2017 | Kazmi | H04L 5/0044 |
| 2017/0111155 | A1* | 4/2017 | Liu | H04L 5/0055 |
| 2017/0163403 | A1* | 6/2017 | Karjalainen | H04L 5/14 |
| 2017/0170946 | A1* | 6/2017 | Min | H04L 5/1438 |
| 2017/0214512 | A1* | 7/2017 | Hu | H04L 5/1461 |
| 2017/0302337 | A1* | 10/2017 | Liu | H04B 7/005 |
| 2018/0026777 | A1* | 1/2018 | Su | H04L 5/16 |

FOREIGN PATENT DOCUMENTS

| | | |
|---|---|---|
| CN | 103634022 A | 3/2014 |
| CN | 103795501 A | 5/2014 |
| CN | 103973349 A | 8/2014 |
| CN | 104269651 A | 1/2015 |
| CN | 104811971 A | 7/2015 |
| CN | 105024797 A | 11/2015 |
| TW | 201605278 A | 2/2016 |

OTHER PUBLICATIONS

Author Unknown, "Performance and efficiency requirements commonly define the 5G key capabilities," Aug. 4, 2014, retrieved from http://www.miit.gov.cn/n1146312/n1146909/n1146991/n1648534/c3489404/content.html, 9 pages total, together with partial English translation thereof.

Baike-Baidu, "Co-frequency Co-time Full Duplex," date unknown, (downloaded Jan. 19, 2017), retrieved from http://baike.baidu.com/view/10206955.htm, together with a partial English translation thereof, 4 pages total.

Bian et al., "Co-time Co-frequency Full Duplex for 802.11 WLAN," IEEE 802.11-13/0765 r1, Jul. 15, 2013, Slide 1-Slide 15.

Hong et al., "Applications of Self-Interference Cancellation in 5G and Beyond," IEEE Communications Magazine, Feb. 2014, pp. 114-121.

Hua et al., "A Method for Broadband Full-Duplex MIMO Radio," IEEE Signal Processing Letters, vol. 19, No. 12, Dec. 2012, pp, 793-796.

Jeong et al., "Cochannel Interference Reduction in Dynamic-TDD Fixed Wireless Applications, Using Time Slot Allocation Algorithms," IEEE Transactions on Communications, vol. 50, No. 10, Oct. 2002, pp. 1627-1636.

Orange Labs, "5G . . . Samsung . . . ," Jun. 25, 2013, retrieved from http://www.naipo.com/Portals/1/web_tw/Knowledge_Center/Industry_Economy/publish-114.htm, 3 pages, together with a partial English translation thereof.

Sabharwal et al., "In-Band Full-Duplex Wireless: Challenges and Opportunities," IEEE Journal on Selected Areas in Communications, vol. 32, No. 9, Sep. 2014 (date of publication: Jun. 12, 2014), pp. 1637-1652.

Solheim, "Microwave Backhaul Radios Meet the Evolving Traffic Challenge," Mobile Dev Design, Feb. 4, 2013, 11 pages.

Wang et al., "A RF Adaptive Least Mean Square Algorithm for Self-interference Cancellation in Co-frequency Co-time Full Duplex Systems," IEEE ICC 2014—Wireless Communications Symposium, 2014, pp. 5622-5627.

Xu et al., "Analysis and Experimental Verification of Digital Self-Interference Cancelation for Co-time Co-frequency Full-Duplex LTE," International Journal of Signal Processing, Image Processing and Pattern Recognition, vol. 7. No. 1, 2014, pp. 299-312.

* cited by examiner

METHOD FOR SETTING MODES OF DATA TRANSMISSION, AND BASE STATION DEVICE AND TERMINAL DEVICE USING THE SAME This application claims the benefit of Taiwan application Serial No. 105141418, filed Dec. 14, 2016, the disclosure of which is incorporated by reference herein in its entirety.

TECHNICAL FIELD

The disclosure relates in general to a method for setting modes of data transmission and a base station device and a terminal device using the same.

BACKGROUND

In response to the requirement of higher data transfer rate as requested by the future communication system, the methods for increasing the data transfer rate have been extensively discussed. For example, the co-time co-frequency full duplex (CCFD) technology is provided, and may even be included in the fifth generation (5G) standards for mobile communications. In the CCFD system, two communication devices can exchange data at the same time using the same frequency. In theory, the spectrum efficiency of the CCFD system is double than that of the conventional duplexing system.

However, in the CCFD system, self-interference will occur when the communication device is transmitting or receiving signals, and will therefore reduce the signal-to-noise ratio (SNR). Self-interference is particularly strong when the communication device is farther away from the base station device and needs to use a larger amount of energy to maintain the quality of signals transmitted between the communication device and the base station device. If the communication device increases the amount of energy when transmitting signals, signal self-interference will be increased at the same time, and normal operation of CCFD system cannot be maintained.

SUMMARY

The disclosure is directed to a method for setting modes of data transmission and a base station device and a terminal device using the same. The base station device can adaptively switch the terminal device to half duplex transmission or full duplex transmission according to a signal quality indicator received from the terminal device so as to effectively increase the data transfer rate of the system. The terminal device can also determine which of half duplex transmission or full duplex transmission is more suitable, and provide the result of determination to the base station device as a reference for the base station device to set the modes of data transmission.

According to one embodiment, a method for setting modes of data transmission adapted to a base station device is provided. The method includes steps of: receiving a signal quality indicator and a value of interference cancellation capability from a terminal device; obtaining a power difference according to the signal quality indicator by subtracting a reception power of the terminal device from a transmission power of the terminal device; comparing the power difference with the value of interference cancellation capability, and setting the terminal device as a first type terminal device only allowed to apply half duplex transmission or a second type terminal device allowed to apply full duplex transmission according to the comparison result.

According to another embodiment, a base station device is provided. The base station device includes an interface circuit and a processing circuit. The interface circuit is used for receiving a signal quality indicator and a value of interference cancellation capability from a terminal device. The processing circuit is coupled to the interface circuit, and configured for: obtaining a power difference according to the signal quality indicator by subtracting a reception power of the terminal device from a transmission power of the terminal device; comparing the power difference with the value of interference cancellation capability, and setting the terminal device as a first type terminal device only allowed to apply half duplex transmission or a second type terminal device allowed to apply full duplex transmission according to the comparison result.

According to an alternate embodiment, a method for setting modes of data transmission, adapted to a terminal device, is provided. The method includes steps of: measuring a transmission power and a reception power with which the terminal device transmits and receives signals; calculating a power difference obtained by subtracting the reception power from the transmission power; and comparing the power difference with a value of interference cancellation capability, and transmitting a first data or a second data to a base station device according to the comparison result. Wherein, the first data instructs the base station device to set the terminal device as a first type terminal device only allowed to apply half duplex transmission, the second data instructs the base station device to set the terminal device as a second type terminal device allowed to apply full duplex transmission.

According to another alternate embodiment, a terminal device is provided. The terminal device includes an interface circuit and a processing circuit. The processing circuit, coupled to the interface circuit, is configured for: obtaining a transmission power and a reception power with which the interface circuit transmits and receives signals; calculating a power difference obtained by subtracting the reception power from the transmission power; and comparing the power difference with a value of interference cancellation capability, and controlling the interface circuit to transmit a first data or a second data to a base station device according to the comparison result. Wherein, the first data instructs the base station device to set the terminal device as a first type terminal device only allowed to apply half duplex transmission, the second data instructs the base station device to set the terminal device as a second type terminal device allowed to apply full duplex transmission.

The above and other aspects of the disclosure will become better understood with regard to the following detailed description of the preferred but non-limiting embodiment(s). The following description is made with reference to the accompanying drawings.

Figure 1:
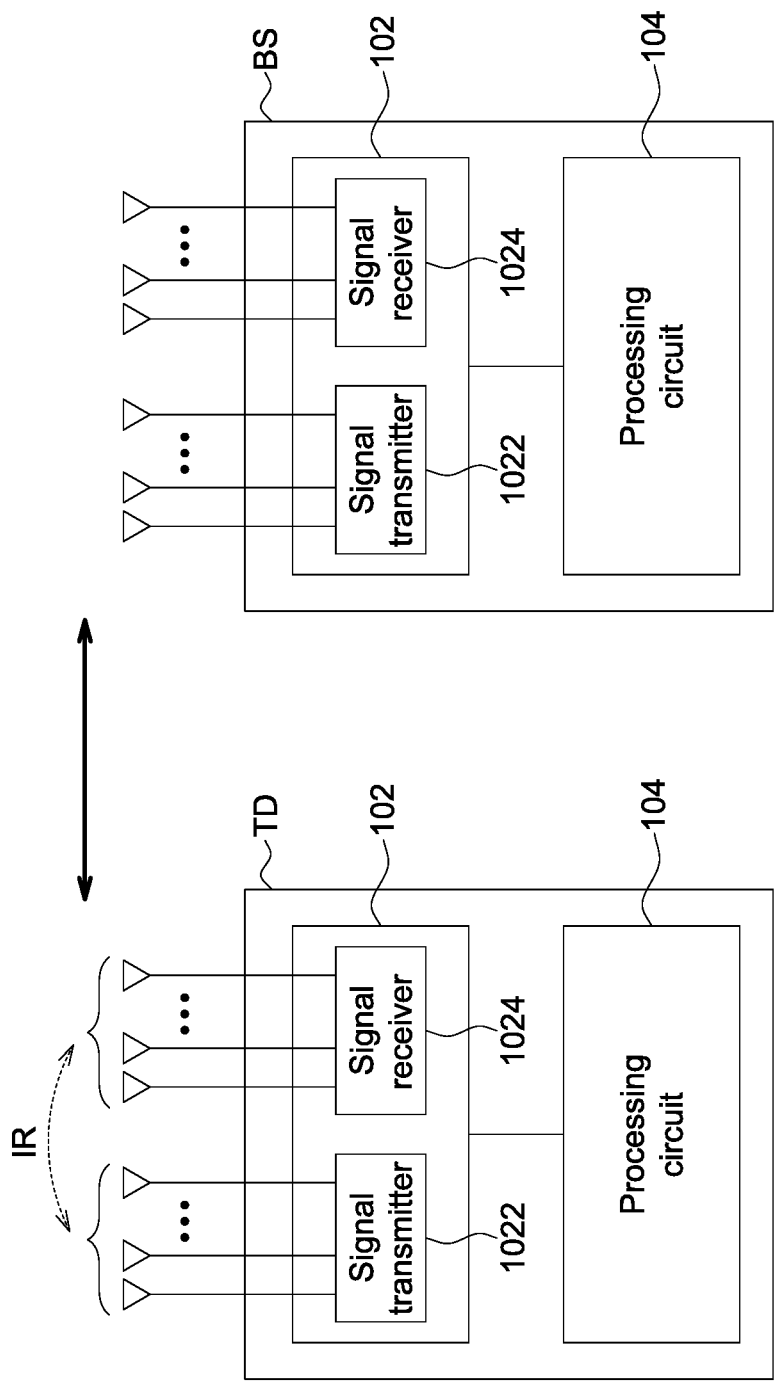
FIG. 1 is a schematic diagram of a communication system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments of the present disclosure are disclosed below with reference to accompanying drawings, but not every embodiment is illustrated in accompanying drawings. In practical application, the present disclosure can have different variations and is not limited to the embodiments exemplified in the specification. A number of embodiments are disclosed in the present disclosure to meet the statutory requirements. Designations common to the accompanying drawings are used to indicate identical or similar elements.

FIG. 1 is a schematic diagram of a communication system according to an embodiment of the disclosure. As indicated in FIG. 1, the communication system includes a base station device BS and a terminal device TD. However, in practical applications, the communication system may include one or more than one base station device BS and one or more than one terminal device TD.

The base station device BS can be realized by a base station equipment such as a macro cell, a micro cell or a pico cell. The terminal device TD can be realized by a user equipment such as a personal computer, a notebook, a tablet PC, or a smartphone. The terminal device TD can establish a wireless transmission link with the base station device BS to access the network.

Each of the base station device BS and the terminal device TD includes an interface circuit 102 and a processing circuit 104. The interface circuit 102 is used for transmitting and receiving signals to communicate with an external device. The interface circuit 102 includes a signal transmitter (Tx) 1022 and a signal receiver (Rx) 1024, and has one or more than one antenna for transmitting and receiving wireless signals. In an embodiment, the signal transmitter 1022 and the signal receiver 1024 can be integrated as a transceiver.

The processing circuit 104, coupled to the interface circuit 102, can be configured to perform the method for setting modes of data transmission according to an embodiment of the disclosure. The processing circuit 104 can be realized by a circuit with arithmetic processing capability, such as a central processing unit (CPU), a micro-processor, or an application-specific integrated circuit (ASIC).

Suppose the terminal device TD supports both half duplex transmission and full duplex transmission. When the terminal device TD applies full duplex transmission, the signal transmitter 1022 and the signal receiver 1024 of the terminal device TD can operate at the same time to achieve a higher data transfer rate. However, the signal receiver 1024 will receive signals from the signal transmitter 1022 so as to generate self-interference IR and reduce the signal-to-noise ratio (SNR) of signals. In comparison to full duplex transmission, when the terminal device TD applies half duplex transmission, the terminal device TD will perform only signal transmission or signal reception at a time, and therefore will not generate self-interference.

In order to combine the advantages of full duplex transmission and the advantages of half duplex transmission, the base station device BS, according to the method for setting modes of data transmission of the disclosure, can adaptively switch the terminal device TD to half duplex transmission or full duplex transmission according to a signal quality indicator transmitted from the terminal device TD to maintain the normal operation and increase the data transfer rate of the system. The terminal device TD can also determine which of half duplex transmission or full duplex transmission is more suitable, and provide the result of determination to the base station device BS as a reference for planning the modes of data transmission.

In an embodiment, full duplex transmission can be realized by co-time co-frequency full duplex (CCFD) transmission, and half duplex transmission can be realized by time division duplexing (TDD) transmission or frequency division duplexing (FDD) transmission.

Figure 2:
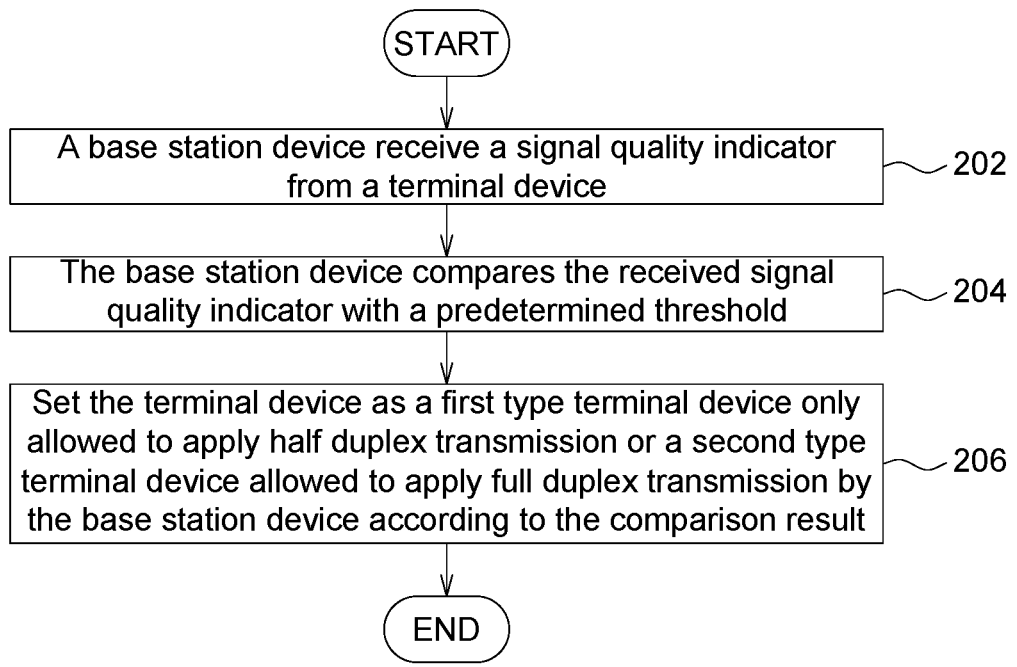
FIG. 2 is a flowchart of a method for setting modes of data transmission according to an embodiment of the disclosure.

FIG. 2 is a flowchart of a method for setting modes of data transmission according to an embodiment of the disclosure. In the present embodiment, the method for setting modes of data transmission is adapted to the base station device BS.

In step 202, a signal quality indicator from a terminal device TD is received by a base station device BS.

The signal quality indicator includes at least one of channel quality indicator (CQI), signal-to-interference-plus-noise ratio (SINR), signal-to-noise ratio (SNR), received signal strength indicator (RSSI), reference signal received quality (RSRQ), reference signal received power (RSRP), rank indicator (RI), and a distance between the terminal device TD and the base station device BS.

In step 204, the received signal quality indicator is compared with a predetermined threshold by the base station device BS.

In step 206, the terminal device TD is set as a first type terminal device only allowed to apply half duplex transmission or a second type terminal device allowed to apply full duplex transmission by the base station device BS according to the comparison result.

For example, whether channel quality indicator (CQI) is smaller than a predetermined threshold is determined by the base station device BS. If yes, the terminal device TD is set as the first type terminal device. If no, the terminal device TD is set as the second type terminal device. Or, whether SINR is smaller than a predetermined threshold is determined by the base station device BS. If yes, the terminal device TD is set as the first type terminal device. If no, the terminal device TD is set as the second type terminal device. The rest can be obtained by the same analogy.

To summarize, after the base station device BS compares the signal quality indicator with the predetermined threshold and determines that that the signal quality is unsatisfactory, the base station device BS sets the terminal device TD as a first type terminal device to maintain the normal operation of the system. Conversely, after the base station device BS compares the signal quality indicator with the predetermined threshold and determines that that the signal quality is satisfactory, the base station device BS sets the terminal device TD as the second type terminal device and selectively applies full duplex transmission to increase the data transfer rate of the system.

The terminal device TD, classified as a second type terminal device according to an embodiment of the disclosure, does not have to apply full duplex transmission. Under one or more than one predetermined condition, the base station device BS still can determine whether the terminal device TD classified as a second type terminal device should apply full duplex transmission or half duplex transmission.

For example, the signal coverage of the base station device BS can be divided into an inner cell range and an outer cell range according to a descending order of signal intensity. The terminal device TD located within the inner cell range can be regarded as an inner ring user, and the terminal device TD located within the outer cell range can be regarded as an outer ring user. Since the inner ring user normally has superior signal quality (if topography and environmental factors are not considered), the base station device BS normally sets the terminal device TD located within the inner cell range as a second type terminal device.

The base station device BS can enable the second type terminal device to apply full duplex transmission in a default manner. However, under some circumstances, the base station device BS can enable the second type terminal device to apply half duplex transmission.

For example, the base station device BS determines whether the second type terminal device is located on the edge of the inner cell range. If yes, this implies that the second type terminal device is very likely to be determined as an outer ring user due to movement or environmental factors, and therefore needs to frequently switch between full duplex transmission and half duplex transmission. To avoid the above misjudgment, when the base station device BS detects that a second type terminal device is located on the edge of an inner cell range, the second type terminal device is set to apply half duplex transmission.

In an embodiment, the base station device BS can compare the signal quality indicator transmitted from a terminal device TD with several predetermined thresholds to determine which numerical interval the signal quality of the terminal device TD falls, so as to clarify whether the terminal device TD is located within the inner cell range, on the edge of the inner cell range or in the outer cell range.

The base station device BS determines whether to apply full duplex transmission according to the data transfer rate as requested by the second type terminal device. For example, if the data transfer rate requested by the second type terminal device is very high, the second type terminal device will be set to apply full duplex transmission no matter the second type terminal device is located on the edge of the inner cell range or not. Conversely, if the data transfer rate requested by a second type terminal device is not too high, the second type terminal device can be set to apply half duplex transmission.

In another example, the base station device BS determines whether to apply full duplex transmission according to whether the second type terminal device supports the full duplex transmission technology. For example, when the base station device BS determines that a second type terminal device does not support the full duplex transmission technology, the second type terminal device is directly set to apply half duplex transmission.

Figure 3A:
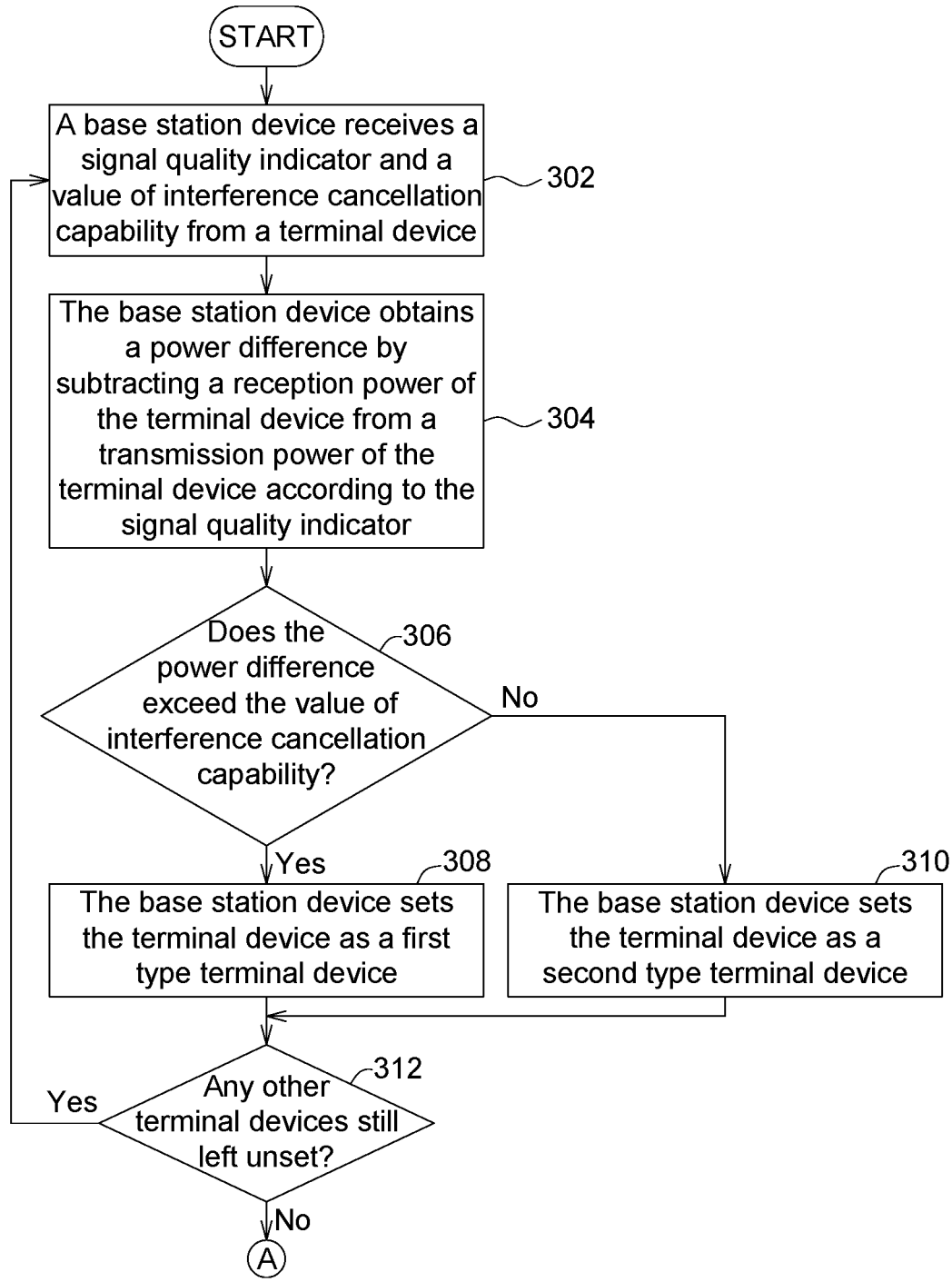
FIGS. 3A and 3B are detailed flowcharts of a method for setting modes of data transmission according to an embodiment of the disclosure.
Figure 3B:
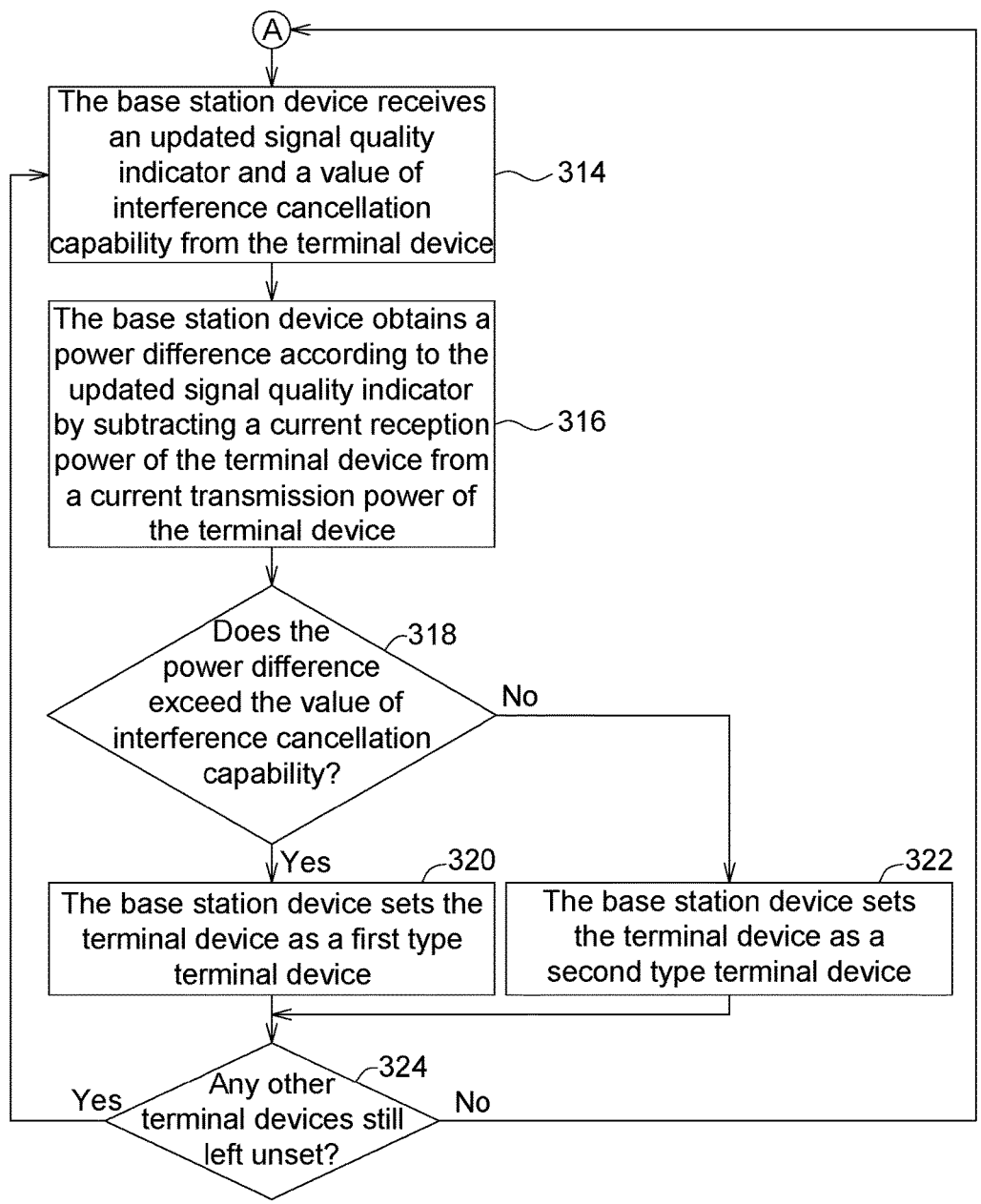

FIGS. 3A and 3B are detailed flowcharts of a method for setting modes of data transmission according to an embodiment of the disclosure. In the present embodiment, the base station device BS determines whether to set the terminal device TD as a first type terminal device or a second type terminal device according to a power difference between the signals transmitted and received by the terminal device TD.

Refer to FIG. 3A. In step 302, a signal quality indicator and a value of interference cancellation capability from a terminal device TD is received by a base station device BS. The signal quality indicator can be described using parameters such as channel quality indicator (CQI), signal-to-interference-plus-noise ratio (SINR), signal-to-noise ratio (SNR), received signal strength indicator (RSSI), reference signal received quality (RSRQ), reference signal received power (RSRP), rank indicator (RI), and a distance between the terminal device TD and the base station device BS. The value of interference cancellation capability can be determined by the terminal device TD according to at least one of the factors such as antenna configuration, frequency, signal bandwidth, power of the transmitting antenna, airspace self-interference cancellation capability, radio frequency domain self-interference cancellation capability, or digital domain self-interference cancellation capability of the terminal device TD.

In step 304, a power difference is obtained by the base station device BS by subtracting a reception power of the terminal device TD from a transmission power of the terminal device TD according to the signal quality indicator.

In an embodiment, the base station device BS estimates the transmission power of the terminal device TD by measuring an uplink signal of the terminal device TD, and obtains the reception power according to the RSSI transmitted from the terminal device TD.

In step 306, whether the power difference exceeds the value of interference cancellation capability is determined by the base station device BS.

In step 308, if it is determined that the obtained power difference exceeds the value of interference cancellation capability, this implies that the transmission power of the terminal device TD is too large and may generate serious self-interference and incapacitate full duplex transmission. Meanwhile, the base station device BS set the terminal device TD as a first type terminal device to limit half duplex data transmission being applied between the base station device BS and the terminal device TD.

Conversely, in step 310, if it is determined that the obtained power difference is smaller than or equal to the value of interference cancellation capability, this implies that the self-interference of the terminal device TD does not affect the normal operation of full duplex transmission. Meanwhile, the base station device BS sets the terminal device TD as a second type terminal device and allows full duplexing transmission to be applied between the base station device BS and the terminal device TD.

In step 312, whether any other terminal devices TD still left unset is determined by the base station device BS. If yes, then the method returns to step 302, the method for setting modes of data transmission is performed to other terminal device TD. If no, the method proceeds to the procedure of node A, the terminal device TD is set as a first type terminal device or a second type terminal device according to the updated signal quality indicator.

FIG. 3B is a flowchart of an example of the procedure of node A.

In step 314, an updated signal quality indicator and a value of interference cancellation capability from the terminal device TD is received by the base station device BS. The updated signal quality indicator refers to the signal quality indicator generated when the terminal device TD performs sampling at the next time point. The value of interference cancellation capability can remain unchanged or can be updated by the terminal device TD according to the type of equipment and the change in the environment.

In step 316, a power difference is obtained by the base station device BS according to the updated signal quality indicator by subtracting a current reception power of the terminal device TD from a current transmission power of the terminal device TD.

In step 318, whether the power difference exceeds the value of interference cancellation capability is determined by the base station device BS.

In step 320, if it is determined that the obtained power difference exceeds the value of interference cancellation capability, then the base station device BS sets the terminal device TD as a first type terminal device to limit half duplexing data transmission being applied between the base station device BS and the terminal device TD.

Conversely, in step 322, if it is determined that the obtained power difference is smaller than or equal to the value of interference cancellation capability, then the base station device BS sets the terminal device TD as a second type terminal device to allow full duplexing data transmission between the base station device BS and the terminal device TD.

In step 324, whether any other terminal devices TD is left unset is determined by the base station device BS. If yes, then the method returns to step 314, the method for setting modes of data transmission is performed to set the terminal device TD as a first type terminal device or a second type terminal device. If no, the procedure of node A is performed again, such that the base station device BS can dynamically switch the modes of data transmission of the terminal device TD (between full duplex transmission and half duplex transmission).

Figure 4:
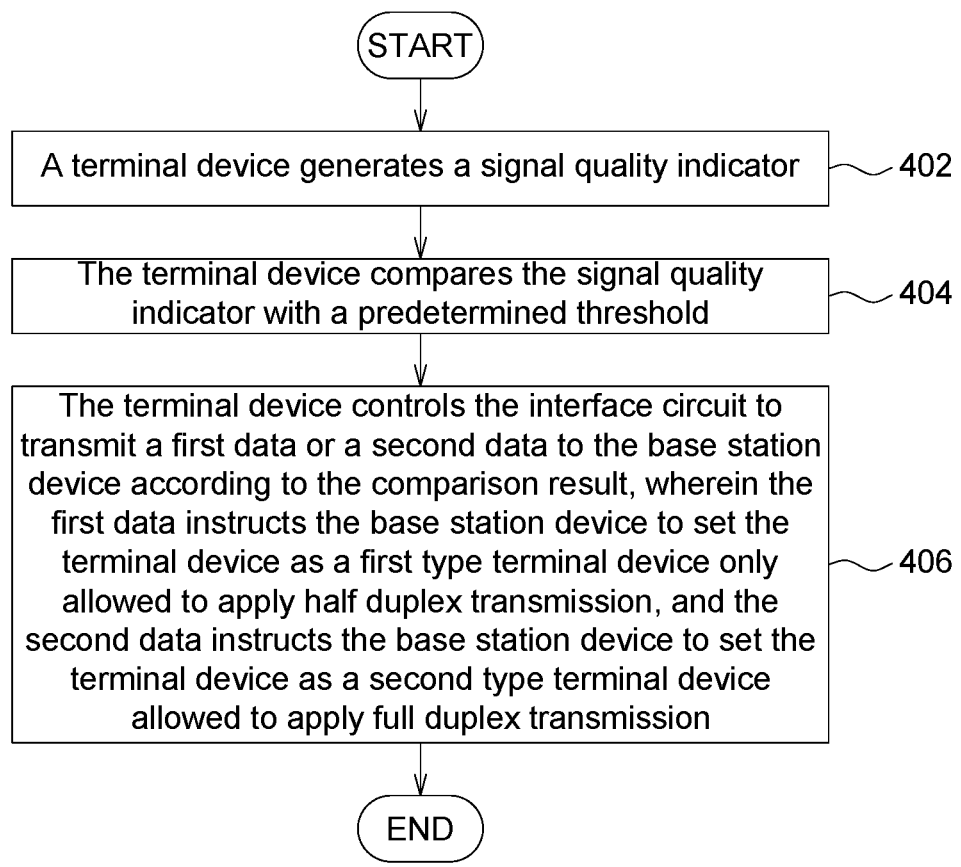
FIG. 4 is a flowchart of a method for setting modes of data transmission according to an embodiment of the disclosure.

FIG. 4 is a flowchart of a method for setting modes of data transmission according to an embodiment of the disclosure. In the present embodiment, the method for setting modes of data transmission is adapted to the terminal device TD.

In step 402, a signal quality indicator is generated by the terminal device TD.

In step 404, the signal quality indicator is compared with a predetermined threshold by the terminal device TD.

In step 406, the interface circuit 102 is controlled by the terminal device TD to transmit a first data or a second data to the base station device BS according to the comparison result, wherein the first data instructs the base station device BS to set the terminal device TD as a first type terminal device only allowed to apply half duplex transmission, and the second data instructs the base station device BS to set the terminal device TD as a second type terminal device allowed to apply full duplex transmission.

In short, the terminal device TD of the present embodiment can determine whether the terminal device TD belongs to a first type terminal device or a second type terminal device, and provide the result of determination as a reference for the base station device BS to set the modes of data transmission.

Figure 5:
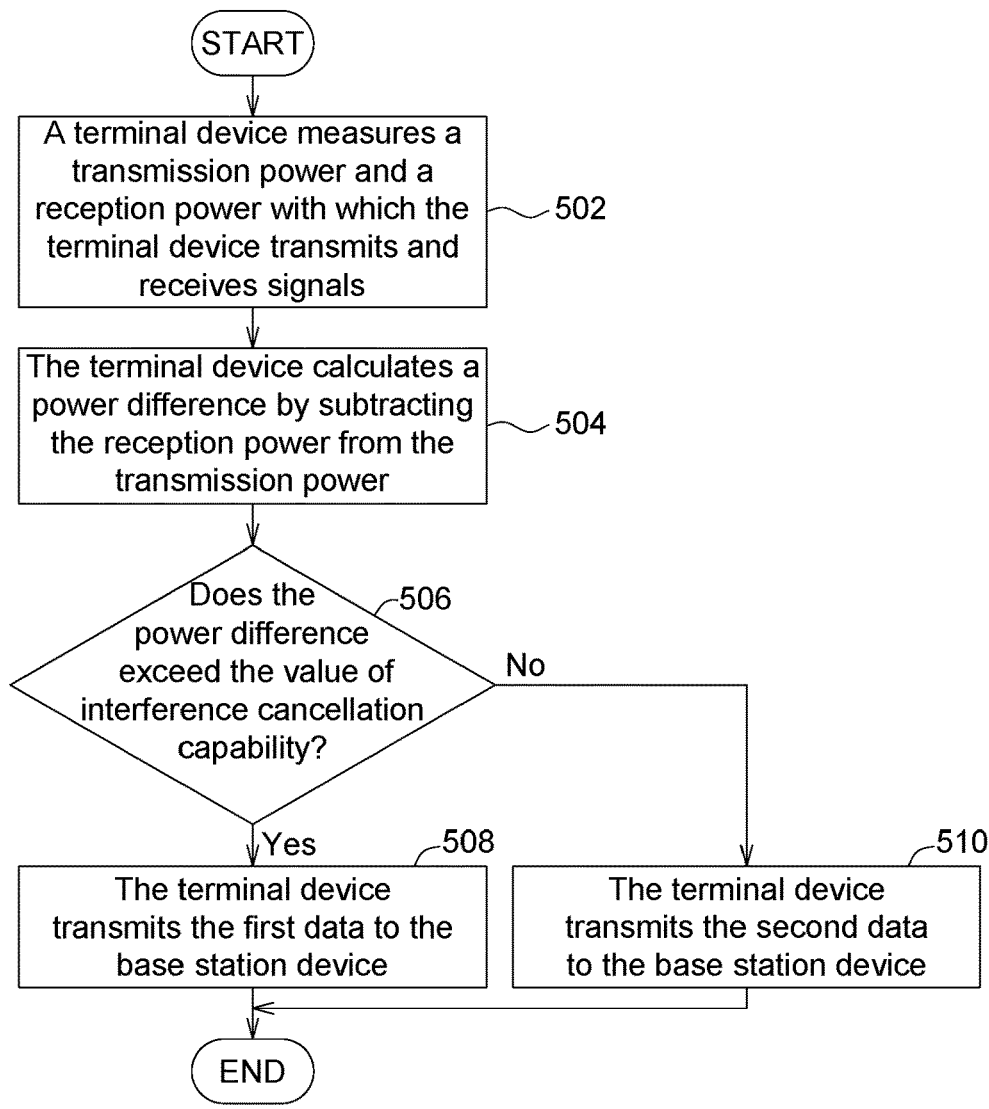
FIG. 5 is a detailed flowchart of a method for setting modes of data transmission according to an embodiment of the disclosure.

FIG. 5 is a detailed flowchart of a method for setting modes of data transmission according to an embodiment of the disclosure. In the present embodiment, the terminal device TD determines whether to transmit the first data or the second data to the base station device BS according to the power difference between the signals transmitted and received by the terminal device TD.

In step 502, a transmission power and a reception power with which the interface circuit 102 transmits and receives signals are measured by the terminal device TD.

In step 504, a power difference between the reception power and the transmission power is calculated by the terminal device TD. For example, the terminal device TD subtracts the reception power from the measured transmission power to obtain the power difference.

In step 506, whether the power difference exceeds the value of interference cancellation capability is determined by the terminal device TD. The value of interference cancellation capability can be determined by the terminal device TD according to the factors such as antenna configuration, frequency, signal bandwidth, power of the transmitting antenna, airspace self-interference cancellation capability, radio frequency domain self-interference cancellation capability, or digital domain self-interference cancellation capability of the terminal device TD.

In step 508, if it is determined that the power difference exceeds the value of interference cancellation capability, then the terminal device TD transmits the first data to the base station device BS to inform the base station device BS that full duplex transmission is not suitable for the time being.

Conversely, in step 510, if it is determined that the obtained power difference is smaller than or equal to the value of interference cancellation capability, then the terminal device TD transmits the second data to the base station device BS to inform the base station device BS that full duplex transmission is suitable for the time being.

The terminal device TD can transmit the first data or the second data to the base station device BS periodically or at scheduled time points, such that the base station device BS can dynamically switch the modes of data transmission of the terminal device TD (between full duplex transmission and half duplex transmission).

Figure 6:
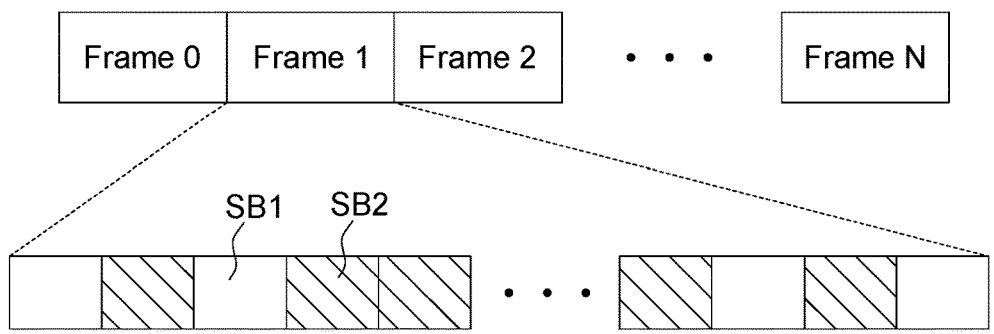
FIG. 6 is a schematic diagram of planning different types of transmission resource on the time domain.

FIG. 6 is a schematic diagram of planning different types of transmission resource on the time domain. in the example of FIG. 6, the base station device BS can use one or more than one first sum-frame SB1 of a frame, such as frame 1, to apply half duplex transmission with the terminal device TD, and use one or more than one second sum-frame SB2 of the same frame to apply full duplex transmission with the terminal device TD.

Figure 7:
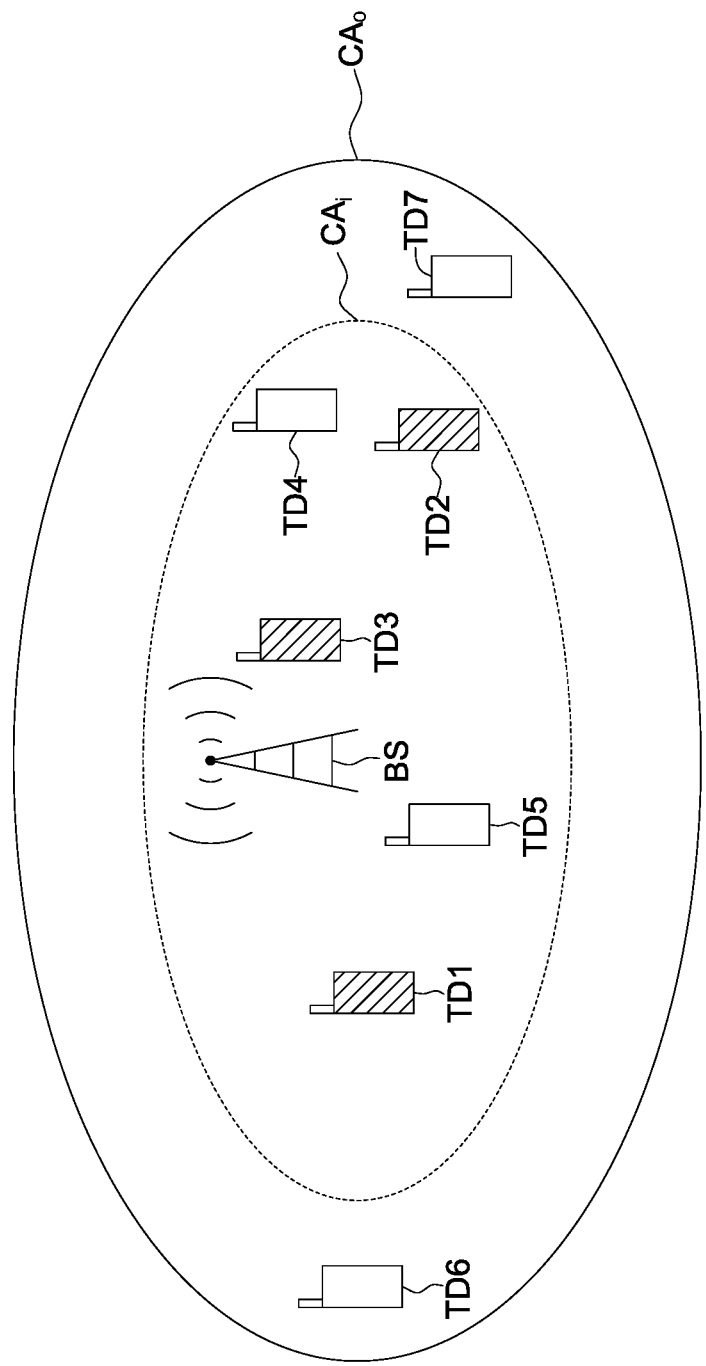
FIG. 7 is a schematic diagram of network configuration according to an embodiment of the disclosure.

FIG. 7 is a schematic diagram of network configuration according to an embodiment of the disclosure. In the present embodiment, the network configuration includes a base station device BS and terminal devices TD1~TD7, wherein the terminal devices TD1~TD4 are second type terminal devices, and the remaining terminal devices TD5~7 are first type terminal devices.

In the present embodiment, the terminal device applying half duplex transmission is denoted by an unshaded rectangular symbol, and the terminal device applying full duplex transmission is denoted by a shaded rectangular symbol in the diagram.

The signal coverage of the base station device BS can be divided into an inner cell range CAi and an outer cell range Cao according to a descending order of intensity. The inner cell range CAi has superior signal quality. Therefore, the terminal devices TD1~TD4 located within the inner cell range CAi are set as second type terminal devices.

As disclosed above, the second type terminal device may apply full duplex transmission or half duplex transmission. Let the terminal device TD4 be taken for example. The terminal device TD4 is set to apply half duplex transmission because the terminal device TD4 is located on the edge of an inner cell range CAi, does not support full duplex transmission, or does not have a requirement of higher data transfer rate.

Besides, due to the topography or other environmental factors, the signal energy received by the terminal device still may be unsatisfactory despite the terminal device being located within the inner cell range CAi or being close to the base station device BS. A terminal device of such type, such as the terminal device TD5, will be set as a first type terminal device.

On the other hand, the outer cell range CAo has inferior signal quality, and is normally referred as cell edge. The signal energy received by terminal devices (such as terminal devices TD6 and TD7) within the outer cell range is normally lower, and the self-interference cannot be completely cancelled if the full duplexing transmission technology is used. Therefore, the terminal device TD6, TD7 is set as the first type terminal device to limit the half duplexing transmission technology being used.

According the method for setting modes of data transmission and the base station device and the terminal device using the same disclosed in above embodiments of the disclosure, the base station device can adaptively switch the terminal device to half duplex transmission or full duplex transmission according to a signal quality indicator transmitted from the terminal device to effectively increase the data transfer rate of the system. The terminal device can determine whether to apply half duplex transmission or full duplex transmission, and provide the result of determination as a reference for the base station device to plan the modes of data transmission.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for setting modes of data transmission, adapted to a base station device, comprising:
   receiving a signal quality indicator and a value of interference cancellation capability from a terminal device;
   obtaining a power difference according to the signal quality indicator by subtracting a reception power of the terminal device from a transmission power of the terminal device; and
   comparing the power difference with the value of interference cancellation capability, and setting the terminal device as a first type terminal device only allowed to apply half duplex transmission or a second type terminal device allowed to apply full duplex transmission;
   wherein a signal coverage of the base station device is divided into an inner cell range and an outer cell range according to a descending order of signal intensity,
   whether the terminal device is located within the inner cell range or the outer cell range is determined according to the signal quality indicator,
   if it is determined that the terminal device is located within the inner cell range, the terminal device is set as the second type terminal device; and
   if it is determined that the terminal device is located within the outer cell range, the terminal device is set as the first type terminal device.

2. The method for setting modes of data transmission according to claim 1, further comprising:
   determining whether the power difference exceeds the value of interference cancellation capability;
   if it is determined that the power difference exceeds the value of interference cancellation capability, setting the terminal device as the first type terminal device; and
   if it is determined that the power difference is smaller than or equal to the value of interference cancellation capability, setting the terminal device as the second type terminal device.

3. The method for setting modes of data transmission according to claim 1, wherein the half duplex transmission is time division duplexing (TDD) transmission or frequency division duplexing (FDD) transmission.

4. The method for setting modes of data transmission according to claim 1, wherein the full duplex transmission is co-time co-frequency full duplex (CCFD) transmission.

5. The method for setting modes of data transmission according to claim 1, wherein the signal quality indicator comprises at least one of channel quality indicator (CQI), signal-to-interference-plus-noise ratio (SINR), signal-to-noise ratio (SNR), received signal strength indicator (RSSI), reference signal received quality (RSRQ), reference signal received power (RSRP), rank indicator (RI), and a distance between the terminal device and the base station device.

6. The method for setting modes of data transmission according to claim 1, further comprising:
   determining whether the terminal device having been set as the second type terminal device is located on an edge of the inner cell range according to the signal quality indicator;
   if yes, applying the half duplex transmission to the terminal device; and
   if no, applying the full duplex transmission to the terminal device.

7. The method for setting modes of data transmission according to claim 1, further comprising:
   determining whether the terminal device having been set as the second type terminal device supports the full duplex transmission;
   if yes, applying the full duplex transmission to the terminal device; and
   if no, applying the half duplex transmission to the terminal device.

8. A base station device, comprising:
   an interface circuit used for receiving a signal quality indicator and a value of interference cancellation capability from a terminal device; and
   a processing circuit coupled to the interface circuit and configured for:
      obtaining a power difference according to the signal quality indicator by subtracting a reception power of the terminal device from a transmission power of the terminal device; and
      comparing the power difference with the value of interference cancellation capability, and setting the terminal device as a first type terminal device only allowed to apply half duplex transmission or a second type terminal device allowed to apply full duplex transmission,
      wherein a signal coverage of the base station device is divided into an inner cell range and an outer cell range according to a descending order of signal intensity,
      whether the terminal device is located within the inner cell range or the outer cell range is determined by the processing circuit according to the signal quality indicator,
      if the processing circuit determines that the terminal device is located within the inner cell range, the processing circuit sets the terminal device as the second type terminal device; and
      if the processing circuit determines that the terminal device is located within the outer cell range, the processing circuit sets the terminal device as the first type terminal device.

9. The base station device according to claim 8, wherein the processing circuit is further used for:
  determining whether the power difference exceeds the value of interference cancellation capability;
  if it is determined that the power difference exceeds the value of interference cancellation capability, setting the terminal device as the first type terminal device; and
  if it is determined that the power difference is smaller than or equal to the value of interference cancellation capability, setting the terminal device as the second type terminal device.

10. The base station device according to claim 8, wherein the half duplex transmission is time division duplexing (TDD) transmission or frequency division duplexing (FDD) transmission.

11. The base station device according to claim 8, wherein the full duplex transmission is co-time co-frequency full duplex (CCFD) transmission.

12. The base station device according to claim 8, wherein the processing circuit is further used for:
  when the terminal device is set as the first type terminal device, applying the half duplex transmission between the base station and the terminal device by using one or more than one first sum-frame; and
  when the terminal device is set as the second type terminal device, applying the full duplex transmission between the base station and the terminal device by using one or more than one second sum-frame.

13. The base station device according to claim 8, wherein the signal quality indicator comprises at least one of channel quality indicator (CQI), signal-to-interference-plus-noise ratio (SINR), signal-to-noise ratio (SNR), received signal strength indicator (RSSI), reference signal received quality (RSRQ), reference signal received power (RSRP), rank indicator (RI), and a distance between the terminal device and the base station device.

14. The base station device according to claim 8, wherein the processing circuit is further used for:
  determining whether the terminal device having been set as the second type terminal device is located on an edge of the inner cell range according to the signal quality indicator;
  if yes, applying the half duplex transmission to the terminal device; and
  if no, applying the full duplex transmission to the terminal device.

15. The base station device according to claim 8, wherein the processing circuit is further used for:
  determining whether the terminal device having been set as the second type terminal device supports the full duplex transmission;
  if yes, applying the full duplex transmission to the terminal device; and
  if no, applying the half duplex transmission to the terminal device.

16. A method for setting modes of data transmission, adapted to a terminal device, comprising:
  measuring a transmission power and a reception power with which the terminal device transmits and receives signals;
  calculating a power difference obtained by subtracting the reception power from the transmission power; and
  comparing the power difference with a value of interference cancellation capability, and transmitting a first data or a second data to a base station device according to a comparison result;
  wherein the first data instructs the base station device to set the terminal device as a first type terminal device only allowed to apply half duplex transmission, and the second data instructs the base station device to set the terminal device as a second type terminal device allowed to apply full duplex transmission;
  wherein a signal coverage of the base station device is divided into an inner cell range and an outer cell range according to a descending order of signal intensity,
  if the base station determines that the terminal device is located within the inner cell range, the terminal device sends the second data to the base station and the terminal device is set as the second type terminal device; and
  if the base station determines that the terminal device is located within the outer cell range, the terminal device sends the first data to the base station and the terminal device is set as the first type terminal device.

17. The method for setting modes of data transmission according to claim 16, further comprising:
  determining whether the power difference exceeds the value of interference cancellation capability;
  if it is determined that the power difference exceeds the value of interference cancellation capability, transmitting the first data to the base station device; and
  if it is determined that the power difference is smaller than or equal to the value of interference cancellation capability, transmitting the second data to the base station device.

18. The method for setting modes of data transmission according to claim 16, wherein the half duplex transmission is time division duplexing (TDD) transmission or frequency division duplexing (FDD) transmission.

19. The method for setting modes of data transmission according to claim 16, wherein the full duplex transmission is co-time co-frequency full duplex (CCFD) transmission.

20. A terminal device, comprising:
  an interface circuit; and
  a processing circuit coupled to the interface circuit and configured for:
    obtaining a transmission power and a reception power with which the interface circuit transmits and receives signals;
    calculating a power difference obtained by subtracting the reception power from the transmission power; and
    comparing the power difference with a value of interference cancellation capability, and controlling the interface circuit to transmit a first data or a second data to a base station device according to a comparison result;
  wherein the first data instructs the base station device to set the terminal device as a first type terminal device only allowed to apply half duplex transmission, and the second data instructs the base station device to set the terminal device as a second type terminal device allowed to apply full duplex transmission;
  wherein a signal coverage of the base station device is divided into an inner cell range and an outer cell range according to a descending order of signal intensity,
  if the base station determines that the terminal device is located within the inner cell range, the terminal device sends the second data to the base station and the terminal device is set as the second type terminal device; and
  if the base station determines that the terminal device is located within the outer cell range, the terminal device sends the first data to the base station and the terminal device is set as the first type terminal device.

21. The terminal device according to claim 20, wherein the processing circuit is further used for:
- determining whether the power difference exceeds the value of interference cancellation capability;
- if it is determined that the power difference exceeds the value of interference cancellation capability, controlling the interface circuit to transmit the first data to the base station device; and
- if it is determined that the power difference is smaller than or equal to the value of interference cancellation capability, controlling the interface circuit to transmit the second data to the base station device.

22. The terminal device according to claim 20, wherein the half duplex transmission is time division duplexing (TDD) transmission or frequency division duplexing (FDD) transmission.

23. The terminal device according to claim 20, wherein the full duplex transmission is co-time co-frequency full duplex (CCFD) transmission.

\* \* \* \* \*